United States Patent
Sugiyama (10) Patent No.: US 8,650,387 B2
(45) Date of Patent: Feb. 11, 2014

(54) IC CHIP, INFORMATION PROCESSING APPARATUS, SOFTWARE MODULE CONTROL METHOD, INFORMATION PROCESSING SYSTEM, INFORMATION PROCESSING METHOD, AND PROGRAM

(75) Inventor: Hirokazu Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 13/062,464

(22) PCT Filed: Sep. 11, 2009

(86) PCT No.: PCT/JP2009/065890
§ 371 (c)(1),
(2), (4) Date: Apr. 20, 2011

(87) PCT Pub. No.: WO2010/029987
PCT Pub. Date: Mar. 18, 2010

(65) Prior Publication Data
US 2012/0096561 A1   Apr. 19, 2012

(30) Foreign Application Priority Data
Sep. 12, 2008   (JP) .............................. P2008-235286

(51) Int. Cl.
*G06F 9/00*   (2006.01)
*G06F 15/177*   (2006.01)

(52) U.S. Cl.
USPC .................... 713/2; 713/1; 713/100; 713/190; 711/148; 711/153; 711/173; 718/1; 718/100; 726/26; 726/27

(58) Field of Classification Search
USPC .......................................................... 726/26
See application file for complete search history.

(56) References Cited

U.S. PATENT DOCUMENTS

| 6,108,744 | A * | 8/2000 | Lebee ........................... 710/266 |
| 6,237,849 | B1 * | 5/2001 | Cooper et al. ................. 235/380 |
| 7,227,449 | B2 * | 6/2007 | Bonneau et al. ........... 340/10.41 |
| 7,536,537 | B2 * | 5/2009 | Linn ................................. 713/1 |
| 2006/0145818 | A1 | 7/2006 | Kusakabe et al. | |

FOREIGN PATENT DOCUMENTS

| JP | 2004-264921 | 9/2004 |
| JP | 2005-275546 | 10/2005 |
| JP | 2007-034987 | 2/2007 |

OTHER PUBLICATIONS

"Urban Cabin Yu's" IC Card Study Group 174, Dual Interface Card with Non-contact Interface Conforming to FeliCa Technical Scheme.

* cited by examiner

*Primary Examiner* — Nathan Flynn
*Assistant Examiner* — Bryan Wright
(74) *Attorney, Agent, or Firm* — K&L Gates LLP (57) ABSTRACT

An IC chip, an information processing apparatus, a software module control method, an information processing system, an information processing method, and a program for ensuring security before booting a software module reliably are provided. A reader/writer and a mobile phone terminal to be accessed by the reader/writer through proximity communication are provided. In the mobile phone terminal, a first software module transmits commands to second and third software modules. The first software module manages states of the second and third software modules. If during boot-up of the third software module, the processing of the second software module is started and completed, then the first software module resumes the boot-up of the third software module.

16 Claims, 7 Drawing Sheets

IC CHIP, INFORMATION PROCESSING APPARATUS, SOFTWARE MODULE CONTROL METHOD, INFORMATION PROCESSING SYSTEM, INFORMATION PROCESSING METHOD, AND PROGRAM

CROSS REFERENCE TO RELATED APPLICATIONS

The present application is a National Stage of International Application No. PCT/JP2009/065890 filed on Sep. 11, 2009 and which claims priority to Japanese Patent Application No. 2008-235286 filed on Sep. 12, 2008 the entire contents of which are being incorporated herein by reference.

BACKGROUND

The present disclosure relates to an IC chip, an information processing apparatus, a software module control method, an information processing system, an information processing method, and a program. More particularly, the invention relates to an IC chip, an information processing apparatus, a software module control method, an information processing system, an information processing method, and a program for ensuring security before booting a software module reliably.

This applicant proposed previously a communication method for handling noncontact IC cards which have different specifications in terms of command systems and security algorithms and which operate on a plurality of principles (e.g., see Japanese Patent Laid-Open No. 2004-264921).

The above proposal involves encompassing the commands sent to and received from IC cards and the resulting responses coming therefrom, by commands called through commands independent of the types of IC cards. The processing involved is performed not by a reader/writer but by a controller module disposed downstream of the reader/writer. The controller module has software modules for dealing with IC cards operating on the diverse principles.

Although a communication system presented by the above proposal can process noncontact IC cards that operate on multiple different principles using a single reader/writer, the proposed system cannot address a single noncontact IC card operating on the multiple different principles.

SUMMARY

Where a single noncontact IC card is used as a card that operates on a plurality of different principles, that card contains software modules each corresponding to one of the multiple principles involved. The software modules are supposed to operate individually at different timings. While any one of the software module is being booted, no other module is supposed to operate concomitantly.

As a result, the software module being booted is eventually halted halfway. It is thus difficult to ensure security before booting a software module.

The present disclosure has been made in view of the above circumstances and provides arrangements for ensuring security before booting a software module reliably.

According to a first embodiment, there is provided an IC chip or an information processing apparatus including: a communication section configured to transmit commands to a plurality of software modules for processing information to be exchanged in accordance with different noncontact communication principles; and a boot management section configured such that if during boot-up of a first software module among the plurality of software modules, the processing of a second software module is started and completed, then the boot management section resumes the boot-up of the first software module.

According to a second embodiment, there is provided an information processing system including: a first information processing apparatus; and a second information processing apparatus configured to be accessed by the first information processing apparatus through proximity communication; wherein the second information processing apparatus includes a communication section configured to transmit commands to a plurality of software modules for processing information to be exchanged in accordance with different noncontact communication principles; and a boot management section configured such that if during boot-up of a first software module among the plurality of software modules, the processing of a second software module is started and completed, then the boot management section resumes the boot-up of the first software module.

According to the first embodiment as outlined above, the communication section is configured to transmit commands to software modules for processing information to be exchanged in accordance with different noncontact communication principles. The boot management section is configured such that if during boot-up of a first software module among the plurality of software modules, the processing of a second software module is started and completed, then the boot management section resumes the boot-up of the first software module.

According to the second embodiment as outlined above, a first information processing apparatus and a second information processing apparatus to be accessed by the first information processing apparatus through proximity communication are provided. The second information processing apparatus includes a communication section and a boot management section. The communication section is configured to transmit commands to software modules for processing information to be exchanged in accordance with different noncontact communication principles. The boot management section is configured such that if during boot-up of a first software module among the plurality of software modules, the processing of a second software module is started and completed, then the boot management section resumes the boot-up of the first software module.

According to the embodiments as outlined above, it is possible to ensure security before booting a software module reliably.

Additional features and advantages are described herein, and will be apparent from, the following Detailed Description and the figures.

DETAILED DESCRIPTION

An embodiment will now be described below. The description will be given under the following headings:

<1. First embodiment>
[System configuration]
[Memory map structure]
[Functional structure of the software module A]
[Mapping state transitions]
[Processing taking place when the software modules F and J are booted]

[System Configuration]

Figure 1:
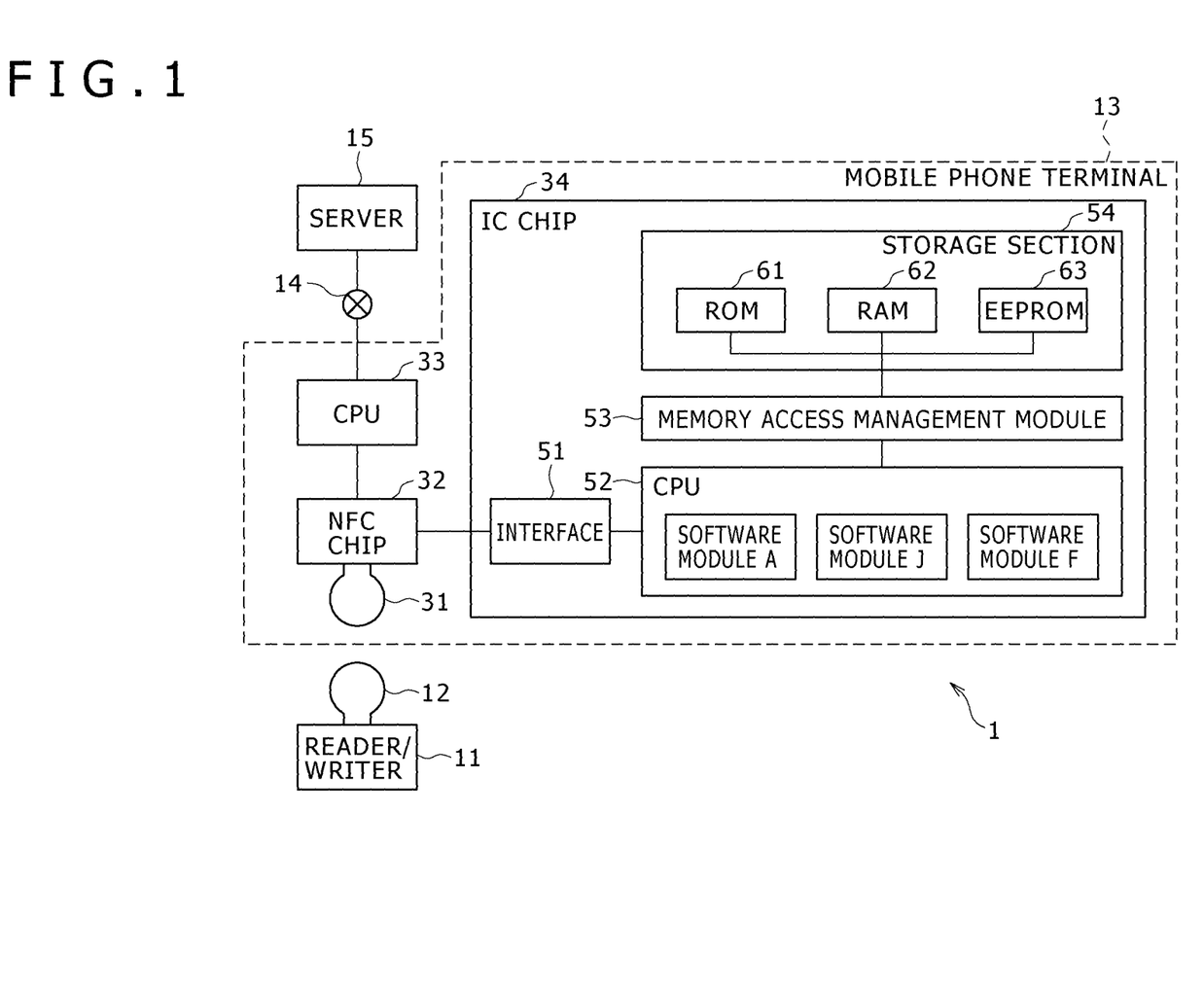
FIG. 1 is a block diagram showing a configuration of an information processing system according to an embodiment.

FIG. 1 is a block diagram showing a configuration of an information processing system according to an embodiment. The information processing system 1 is constituted by a reader/writer 11 having an antenna 12, by a mobile phone terminal 13 and by a server 15. The mobile phone terminal 13 is connectable to the server 15 via a mobile phone communication network 14. That is, with this embodiment, it is the reader/writer 11 and server 15 that can access the mobile phone terminal 13.

The mobile phone terminal 13 has an antenna 31, an NFC (Near Field Communication) chip 32, a CPU (Central Processing Unit) 33, and an IC chip 34 made up of an LSI (Large Scale Integration) or the like.

The NFC chip 32 and the reader/writer 11 using their respectively owned antennas 31 and 12 perform noncontact communication therebetween exemplified by NFC. The CPU 33 controls the operation of the mobile phone terminal 13.

The IC chip 34 is made up of an interface 51, a CPU 52, a memory access management module 53, and a storage section 54. The storage section 54 is composed of a ROM (Read Only Memory) 61, a RAM (Random Access Memory) 62, and an EEPROM (Electrically Erasable and Programmable Read Only Memory) 63.

The interface 51 performs interface processing between the NFC chip 32 and the CPU 52. The CPU 52 carries out various processes based on software modules A, J and F that have been installed therein.

The software module J is an operating system that processes noncontact IC cards operating on a first principle, one such card being a Java Card (registered trademark of Sun Microsystems, Inc.). The software module F is an operating system that processes noncontact IC cards operating on a second principle, one such card being a FeliCa (registered trademark of Sony Corporation). The software module A is an operating system which acts as a mapping section performing mapping processing on memory maps and which arbitrates the timing between the software module F and the software module J in such a manner that the two modules do not operate simultaneously.

That is, the software module A performs the mapping in such a manner that any software module (e.g., software module J) other than an established software module (e.g., software module F) among a plurality of software modules (e.g., software modules F and J) is inhibited from operating at the same timing as the established software module (software module F).

The ROM 61 in the storage section 54 stores programs, parameters, and other information. The RAM 62 temporarily stores information. The EEPROM 63 stores the information that needs to be retained after power is turned off.

The memory access management module 53 acting as an operation management section for managing the operations of software modules based on maps controls access to the storage section 54 by the CPU 52 on the basis of the retained memory map. If an attempt is made to access any area on which the operation is inhibited by the memory map that is a map of the information stored in the storage section 54, then the memory access management module 53 performs hardware reset.

[Memory Map Structure]

Figure 2:
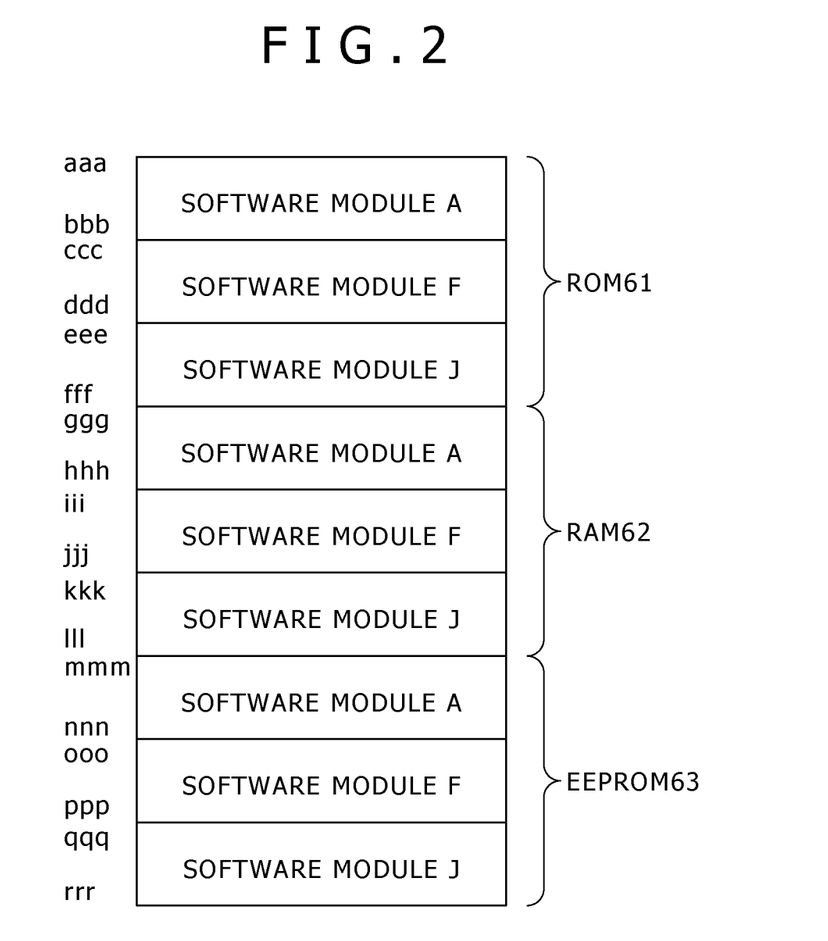
FIG. 2 is a schematic view showing a structure of principle of a memory map.

FIG. 2 shows a structure of principle of a memory map that permits or inhibits the operations of software modules. In the area between address "aaa" and address "bbb," the information about the software module A in the ROM 61 is stored. In the area between address "ccc" and address "ddd," the information about the software module F in the ROM 61 is stored. In the area between address "eee" and address "fff," the information about the software module J in the ROM 61 is stored.

In the area between address "ggg" and address "hhh," the information about the software module A in the RAM 62 is stored. In the area between address "iii" and address "jjj," the information about the software module F in the RAM 62 is stored. In the area between address "kkk" and address "lll," the information about the software module J in the RAM 62 is stored.

In the area between address "mmm" and address "nnn," the information about the software module A in the EEPROM 63 is stored. In the area between address "ooo" and address "ppp," the information about the software module F in the EEPROM 63 is stored. In the area between address "qqq" and address "rrr," the information about the software module J in the EEPROM 63 is stored.

[Functional Structure of the Software Module A]

Figure 3:
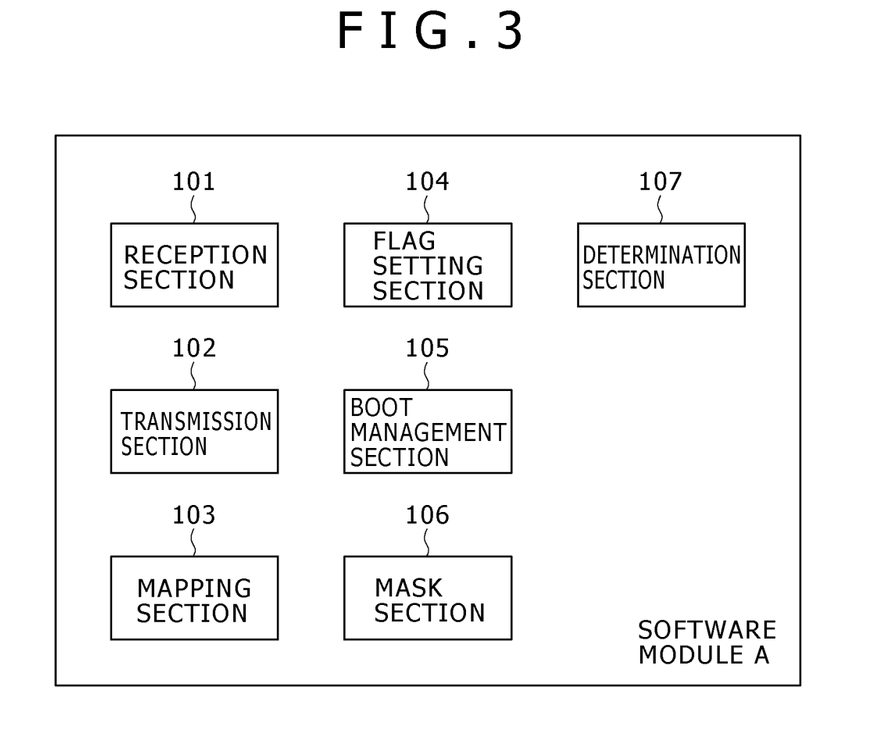
FIG. 3 is a block diagram showing a structure of a software module A.

FIG. 3 shows a functional structure of the software module A. The software module A includes a reception section 101, a transmission section 102, a mapping section 103, a flag setting section 104, a boot management section 105, a mask section 106, and a determination section 107.

The reception section 101 receives information from the other software modules. The transmission section 102 constituting a communication section in combination with the reception section 101 transmits information to the other software modules. The mapping section 103 performs mapping processing on memory maps. The flag setting section 104 acting as a state management section sets flags for state management.

The boot management section 105 manages the boot-up of the software modules A and F. The mask section 106 masks or unmasks interrupts made by one of the software modules A and F to the other module operating. The determination section 107 determines the types of packets and whether a software module is being booted.

[Mapping State Transitions]

Figure 4:
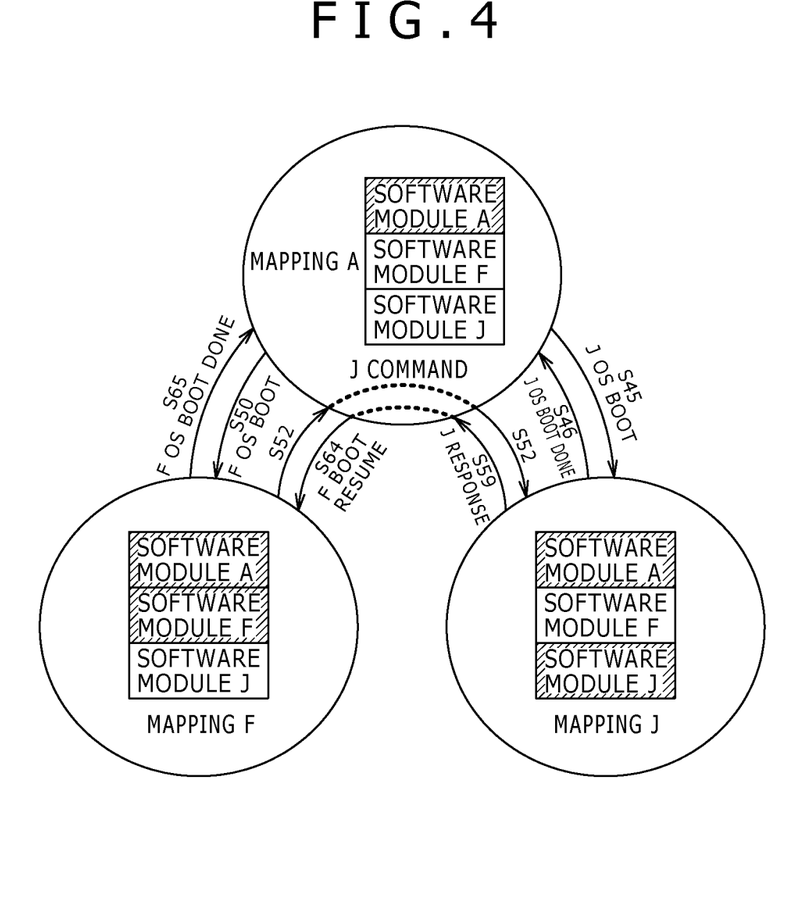
FIG. 4 is a schematic view showing mapping state transitions.

FIG. 4 shows mapping state transitions. With this embodiment, there exist three states: mapping A, mapping F, and mapping J. In mapping A, only the software module A is allowed to operate while the software modules F and J are inhibited from operating. In mapping F, only the software modules A and F are allowed to operate while the software module J is inhibited from operating. In mapping J, only the software modules A and J are allowed to operate while the software module F is inhibited from operating.

State transitions occur from mapping A to mapping F or from mapping A to mapping J. Conversely, state transitions may occur from mapping F to mapping A or from mapping J to mapping A. A direct state transition from mapping F to mapping J or from mapping J to mapping F in reverse is inhibited.

Because the software modules F and J are inhibited from operating at the same time as described above, security is ensured.

The mapping is determined by the mapping section 103 in accordance with the destination (communication principle) of a received command packet. The software module A is always held in an operable state.

[Processing Taking Place when the Software Modules F and J are Booted]

Figure 5:
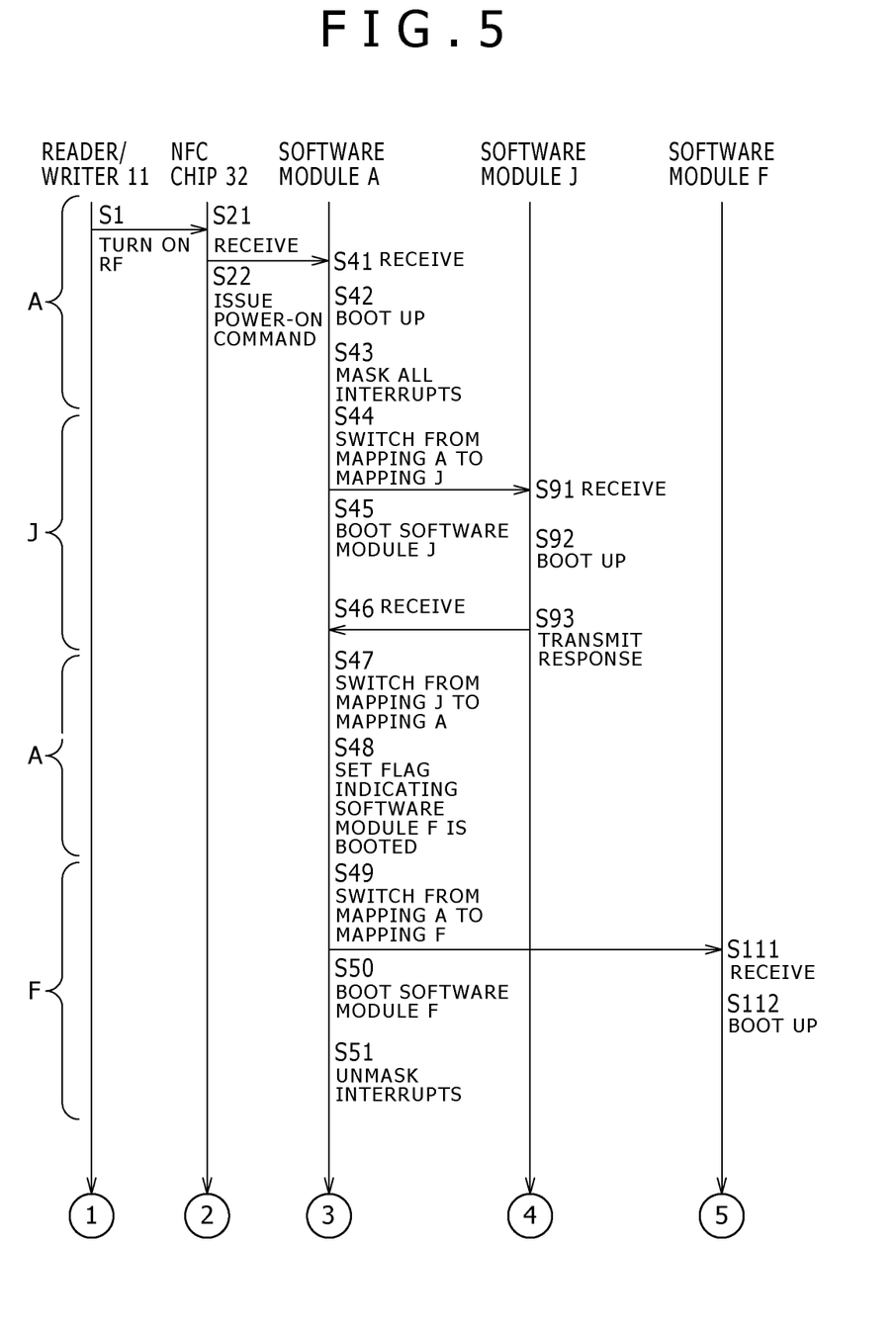
FIG. 5 is a flowchart explanatory of the processing taking place when a reader/writer boots an IC chip.
Figure 6:
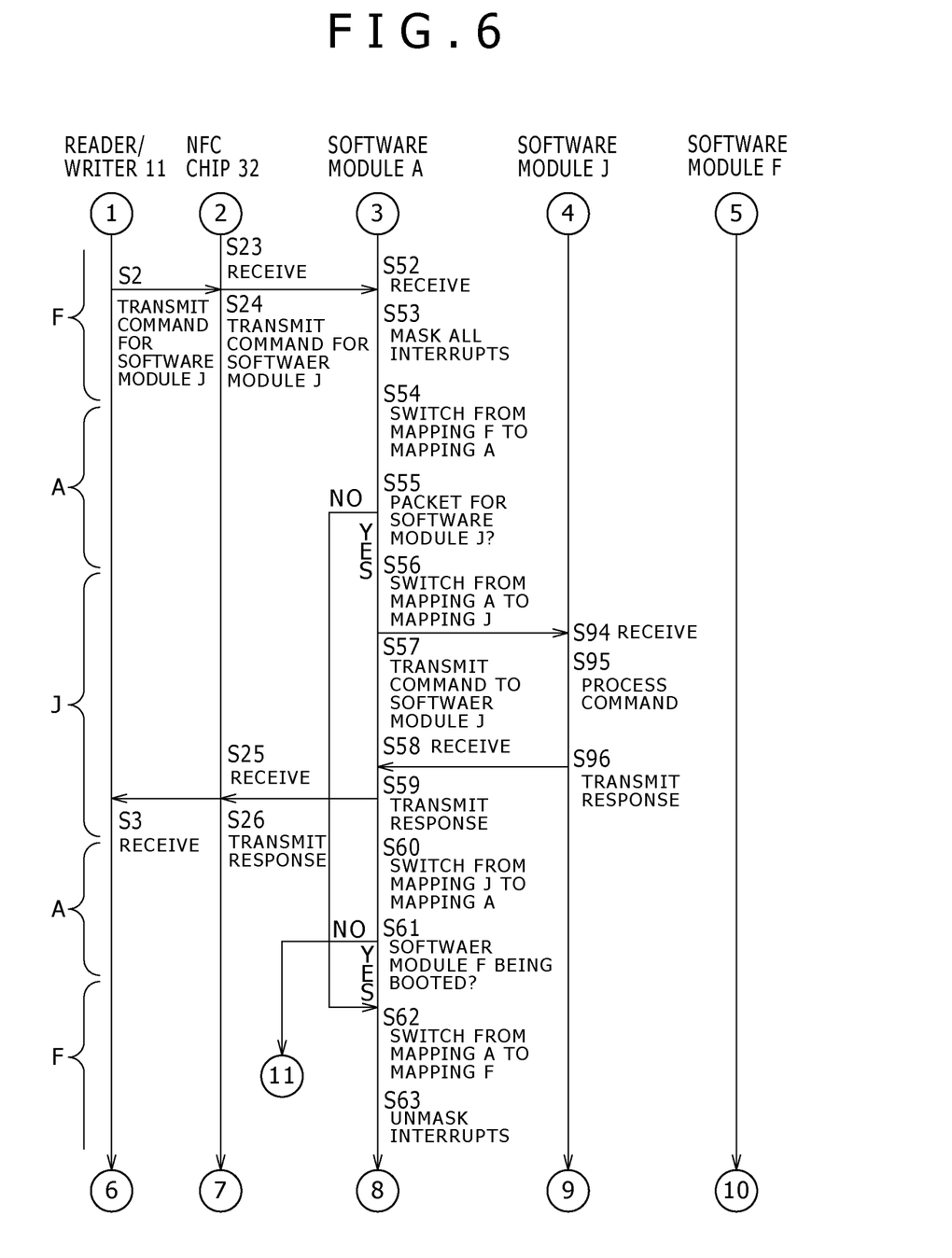
FIG. 6 is another flowchart explanatory of the processing taking place when the reader/writer boots the IC chip.
Figure 7:
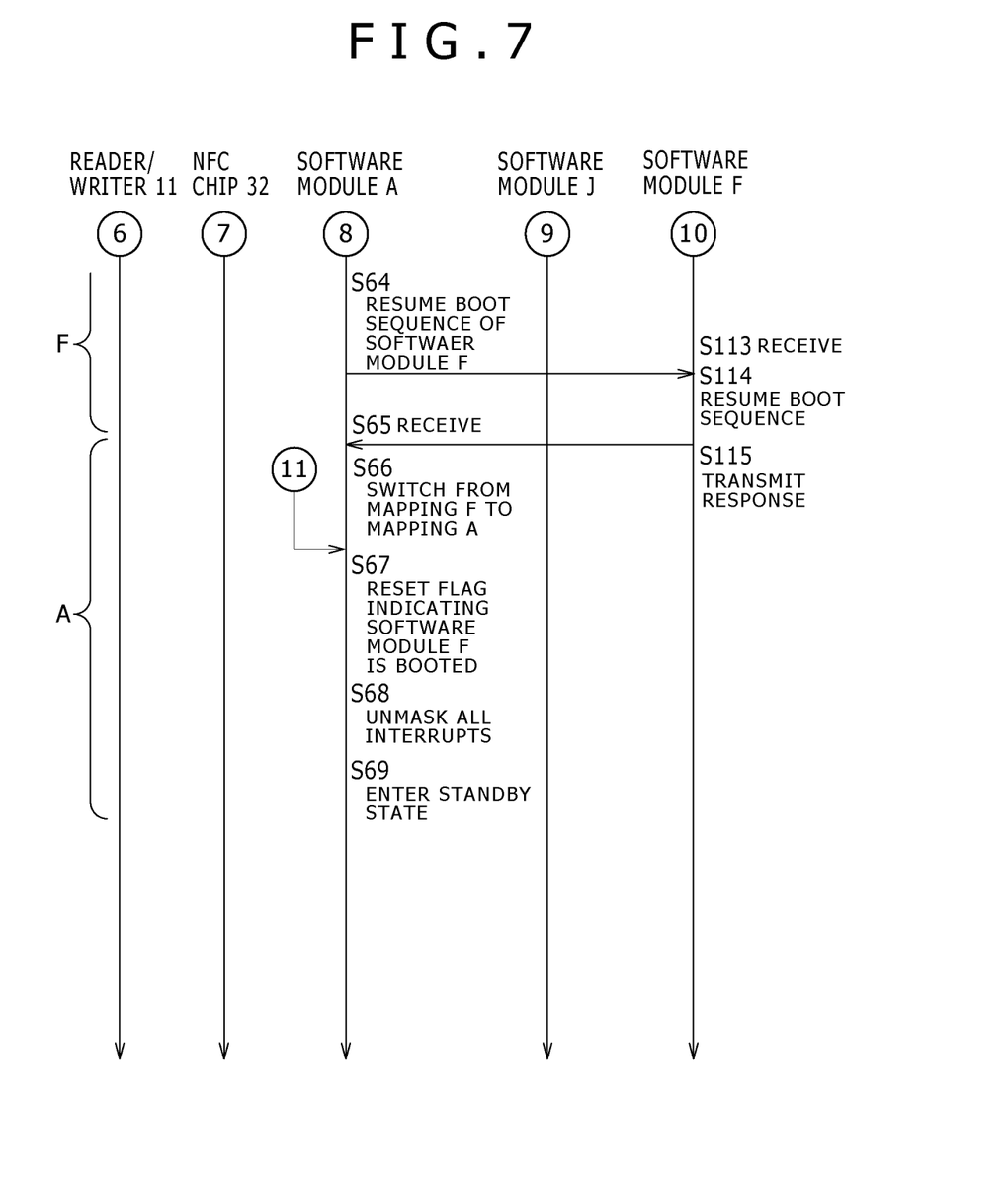
FIG. 7 is another flowchart explanatory of the processing taking place when the reader/writer boots the IC chip.

FIGS. 5 through 7 show the processing taking place when the software modules F and J are booted.

In step S1, the reader/writer 11 turns on RF (Radio Frequency). That is, the reader/writer 11 emits an RF signal via the antenna 12. In step S21, the NFC chip 32 receives the RF signal via the antenna 31. In step S22, the NFC chip 32 issues a power-on command to the IC chip 34.

In step S41, the reception section 101 of the software module A receives the command from the NFC 32 via the interface 51. Then in step S42, the boot management section 105 boots the software module A itself. In step S43, the mask section 106 masks all interrupts.

In a standby state, mapping A is in effect. That means all software modules except the module A are inhibited from conducting communications. Thus the reception process is performed solely by the software module A.

In step S44, the mapping section 103 of the software module A switches mapping states from mapping A to mapping J so that the software module J may be booted later in step S45. This permits communications only between the software module A and the software module J and inhibits all other communications.

In step S45, the transmission section 102 of the software module A transmits to the software module J a command packet to boot the latter, thereby booting the software module J.

In step S91, the software module J receives the command packet from the software module A. And in step S92, the software module J boots itself up in response to the received command. In step S93, the software module J transmits a response packet to the software module A reflecting the result of the boot-up process.

In step S46, the reception section 101 of the software module A receives the response packet from the software module J. This allows the boot management section 105 to verify that the boot-up of the software module J is completed.

Next in step S47, the mapping section 103 of the software module A switches mapping states from mapping J to mapping A so that later in step S48 the software module A may set a flag by itself. This allows the software module A alone to perform its processing and inhibits all other software modules from carrying out their processing. In step S48, the flag setting section 104 of the software module A sets a flag indicating that the software module F is being booted.

In step S49, the mapping section 103 switches mapping states from mapping A to mapping F so as to boot the software module F later in step S50. This allows only the software modules A and J to perform their processing and inhibits all other software modules from carrying out their processing.

In step S50, the transmission section 102 of the software module A transmits to the software module F a command packet to boot the latter, thereby booting the software module F. Since the software module F performs its boot-up process in an interruptible processing mode, the mask section 106 of the software module A unmasks interrupts in step S51. This allows interrupts to take place.

Meanwhile in step S111, the software module F receives the command packet sent from the software module A. In step S112, the software module F starts its boot-up process in response to the received command.

Suppose now that in step S2 the reader/writer 11 transmits a command for the software module J. This command is transmitted from the reader/writer 11 via the antenna 12. In step S23, the NFC chip 32 receives the command via the antenna 31. In step S24, the NFC chip 32 transmits the command for the software module J to the IC chip 34.

In step S52, the reception section 101 of the software module A receives the command from the NFC 32 via the interface 51. Then in step S53, the mask section 106 masks all interrupts so that the software module J may perform its boot-up process in an uninterruptible processing mode.

In step S54, the mapping section 103 switches mapping states from mapping F to mapping A so that a process to determine whether the command packet received in step S52 is a packet for the software module J may be carried out later in step S55. This allows only the software module A to perform its processing and inhibits all other software modules from carrying out their processing.

When the mapping states are switched, the boot-up process of the software module F is halted halfway.

In step S55, the determination section 107 determines whether the command packet received in step S52 is a packet for the software module J. If it is determined that the command packet received in step S52 is a packet for the software module J, then the mapping section 103 in step S57 switches mapping states from mapping A to mapping J so as to transmit the command packet to the software module J later in step S57. This allows only the software modules A and J to perform their processing and inhibits all other software modules from carrying out their processing.

In step S57, the transmission section 102 of the software module A transmits the command packet to the software module J.

In step S94, the software module J receives the command packet from the software module A. Then in step S95, the software module J performs a process corresponding to the received command. In step S96, the software module J transmits to the software module A a response packet of the module J reflecting the result of the process.

In step S58, the reception section 101 of the software module A receives the response packet from the software module J. In step S59, the transmission section 102 transmits to the reader/writer 11 the response received from the software module J.

In step S25, the NFC chip 32 receives the response from the software module A via the interface 51. Then in step S26, the NFC chip 32 transmits the response to the reader/writer 11 via the antenna 31.

In step S3, the reader/writer 11 receives the response from the NFC chip 32 via the antenna 12. This means that the reader/writer 11 has received from the software module J the response to the command transmitted in step S2.

In step S60, the mapping section 103 switches mapping states from mapping J to mapping A so that later in step S61 a process to determine whether the software module F is being booted may be performed. This allows only the software module A to perform its processing and inhibits all other software modules from carrying out their processing.

In step S61, the determination section 107 determines whether the software module F is being booted. The determination may be performed based on the flag set in step S48.

If it is determined that the software module F is being booted (i.e., if the flag is set), then the mapping section 103 in step S62 switches mapping states from mapping A to mapping F so as to transmit a command packet to the software module F later in step S64. This allows only the software modules A and F to perform their processing and inhibits all other software modules from carrying out their processing.

If it is determined in step S55 that the packet received in step S52 is not a packet for the software module J, then steps S56 through S61 are also skipped, and step S62 is carried out.

In step S63, the mask section 106 unmasks interrupts. That is, an interruptible state is brought into effect.

In step S64, the boot management section 105 of the software module A controls the transmission section 102 to transmit to the software module F a command packet designed to resume the boot sequence of the software module F.

In step S113, the software module F receives the command packet from the software module A. And in step S114, the software module F resumes the temporarily halted boot sequence in response to the received command. When the boot sequence is completed, the software module F in step S115 transmits to the software module A a response packet of the software module F reflecting the result of the process.

In step S65, the reception section 101 of the software module A receives the response packet from the software module F. This allows the boot management section 105 to verify that the boot-up of the software module F is completed.

In step S66, the mapping section 103 of the software module A switches mapping states from mapping F to mapping A so as to reset the flag later in step S66. This allows the software module A to perform its processing and inhibits all other software modules from carrying out their processing.

In step S67, the flag setting section 104 of the software module A resets the flag which was set in step S48 and which has indicated the software module F is being booted.

If it is determined in step S61 that the software module F is not being booted, then steps S62 through S66 are also skipped, and step S67 is carried out.

In step S68, the mask section 106 unmasks all interrupts. This brings an interruptible state into effect. In step S69, the mapping section 103 changes its mode to a standby state.

The foregoing description explained how the reader/writer 11 gains access to the IC chip 34. Substantially similar processing takes place when the server 15 accesses the IC chip 34 via the CPU 33 over the mobile phone communication network 14.

There are at least two software modules operating on different principles. There may be three or more such software modules configured.

Interrupts are inhibited during the period in which processes cannot be halted asynchronously. Such processes should preferably be carried out beforehand as much as possible. This allows the interrupt inhibit period to be shortened (i.e., terminated quickly).

The present embodiments can also be applied to cases in which the IC chip 34 is housed in a noncontact IC card or in some other information processing apparatus.

The series of steps and processes described above may be executed either by hardware or by software. Where the software-based processing is to be carried out, the programs constituting the software may be either incorporated beforehand in the dedicated hardware of the computer to be used or installed upon use from a suitable program recording medium into a general-purpose personal computer or like equipment capable of executing diverse functions based on the installed programs.

In this description, the steps describing the programs involved represent not only the processes that are to be carried out in the depicted sequence (i.e., on a time series basis) but also processes that may be performed parallelly or individually and not necessarily chronologically.

In this description, the term "system" refers to an entire configuration made up of a plurality of component apparatuses.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An IC chip comprising:
  a plurality of different software modules, each operating according to a different noncontact communication principle;
  a communication section configured to transmit commands, in accordance with the different noncontact communication principles, to the plurality of software modules for processing, wherein a mask section of the IC chip is configured to mask all interrupts before transmitting the command to the software modules; and
  a boot management section configured to switch software module boot-up based on the received transmitted command, wherein if during boot-up of a first software module among said plurality of software modules, the transmitted command is for processing of a second software module, than the second software module boot-up is started and completed, and thereafter the boot-up of said first software module may resume.

2. The IC chip according to claim 1, further comprising:
  an operation management section configured to store map information about said plurality of software modules in order to manage operations of said software modules based on said map information; and
  a mapping section configured to map said map information for permitting or inhibiting the operations of said plurality of software modules;
  wherein said communication section, said boot management section, said mask section, and said mapping section are constituted by a further software module.

3. The IC chip according to claim 2, wherein, if any of said software modules of which the operation is inhibited is operated, then said operation management section performs a hardware reset.

4. The IC chip according to claim 3, wherein said further software module maps states in which only one of said software modules is operated.

5. The IC chip according to claim 4, wherein said further software module maps said map information based on the destination of a received command.

6. A control method for an apparatus including an IC chip including a plurality of different software modules each operating according to a different noncontact communication principle, a communication section and a boot management section configured to switch software module boot-up based on a received transmitted command from a mask section of the IC chip, said control method comprising:
  causing said communication section to transmit commands, in accordance with the different noncontact communication principles, to the plurality of software modules for processing, wherein the mask section of the IC chip is configured to mask all interrupts before transmitting the command to the software modules; and
  if during boot-up of a first software module among said plurality of software modules, the transmitted command is for processing of a second software module, than the second software module boot-up is started and completed, then thereafter resuming the boot-up of said first software module.

7. A non-transitory computer readable storage medium comprising a computer program product including executable instructions that when executed by a processor perform steps for:

transmitting commands to a plurality of different software modules for processing information to be exchanged in accordance with different noncontact communication principles, the plurality of different software modules being included on an IC chip, wherein a mask section of the IC chip is configured to mask all interrupts before transmitting the command to the software modules;

managing states of said software modules; and if during boot-up of a first software module among said plurality of software modules, the transmitted command is for processing of a second software module, than the second software module is started and completed, then thereafter resuming the boot-up of said first software module.

8. An information processing apparatus comprising:

an IC chip including a plurality of different software modules, each operating according to a different noncontact communication principle, a communication section configured to transmit commands, in accordance with the different noncontact communication principles, to the plurality of software modules for processing, wherein a mask section of the IC chip is configured to mask all interrupts before transmitting the command to the software modules, and a boot management section configured to switch software module boot-up based on the received transmitted command, wherein if during boot-up of a first software module among said plurality of software modules, the transmitted command is for processing of a second software module, than the second software module boot-up is started and completed, and thereafter the boot-up of said first software module may resume.

9. The information processing apparatus according to claim 8, further comprising:

an operation management section configured to store map information about said plurality of software modules in order to manage operations of said software modules based on said map information; and a mapping section configured to map said map information for permitting or inhibiting the operations of said plurality of software modules;

wherein said communication section, said boot management section, said mask section, and said mapping section are constituted by a further software module.

10. The information processing apparatus according to claim 9, wherein, if any of said software modules of which the operation is inhibited is operated, then said operation management section performs a hardware reset.

11. The information processing apparatus according to claim 10, wherein said further software module maps states in which only one of said software modules is operated.

12. The information processing apparatus according to claim 8, wherein said further software module maps said map information based on the destination of a received command.

13. An information processing system comprising:

an IC chip;

a first information processing apparatus; and a second information processing apparatus configured to be accessed by said first information processing apparatus through proximity communication;

wherein said second information processing apparatus includes the IC chip that includes a plurality of different software modules, each operating according to a different noncontact communication principle;

a communication section configured to transmit commands, in accordance with the different noncontact communication principles, to the plurality of software modules for processing, wherein a mask section of the IC chip is configured to mask all interrupts before transmitting the command to the software modules; and a boot management section configured to switch software module boot-up based on the received transmitted command, wherein if during boot-up of a first software module among said plurality of software modules, the transmitted command is for processing of a second software module, than the second software module boot-up is started and completed, and thereafter the boot-up of said first software module may resume.

14. An information processing method of an information processing system comprising a first information processing apparatus; and a second information processing apparatus configured to be accessed by said first information processing apparatus through proximity communication, said second information processing apparatus further including an IC chip including a plurality of different software modules, each operating according to a different noncontact communication principle, a communication section and a boot management section;

said information processing method comprising:

causing said communication section to transmit commands, in accordance with the different noncontact communication principles, to the plurality of software modules for processing, wherein the mask section of the IC chip is configured to mask all interrupts before transmitting the command to the software modules; and if during boot-up of a first software module among said plurality of software modules, the transmitted command is for processing of a second software module, than the second software module boot-up is started and completed, then thereafter resuming the boot-up of said first software module.

15. An IC chip comprising:

a communication section configured to transmit commands to a plurality of software modules for processing information to be exchanged in accordance with different noncontact communication principles;

a boot management section configured to switch software module boot-up based on the received transmitted command, wherein if during boot-up of a first software module among said plurality of software modules, the transmitted command is for processing of a second software module, than the second software module boot-up is started and completed, and thereafter the boot-up of said first software module may resume;

a mask section configured to unmask interrupts while the boot-up of said first software module is underway, said mask section further masking interrupts while the boot-up of said second software module is underway;

an operation management section configured to store map information about said plurality of software modules in order to manage operations of said software modules based on said map information; and a mapping section configured to map said map information for permitting or inhibiting the operations of said plurality of software modules, wherein said communication section, said boot management section, said mask section, and said mapping section are constituted by a further software module, and wherein, if any of said software modules of which the operation is inhibited is operated, then said operation management section performs a hardware reset.

16. An information processing apparatus comprising:

an IC chip including a communication section configured to transmit commands to a plurality of software modules for processing information to be exchanged in accordance with different noncontact communication principles, a boot management section configured to switch software module boot-up based on the received transmitted command, wherein if during boot-up of a first software module among said plurality of software modules, the transmitted command is for processing of a second software module, than the second software module boot-up is started and completed, and thereafter the boot-up of said first software module may resume, a mask section configured to unmask interrupts while the boot-up of said first software module is underway, said mask section further masking interrupts while the boot-up of said second software module is underway, an operation management section configured to store map information about said plurality of software modules in order to manage operations of said software modules based on said map information, and a mapping section configured to map said map information for permitting or inhibiting the operations of said plurality of software modules, wherein said communication section, said boot management section, said mask section, and said mapping section are constituted by a further software module, and wherein, if any of said software modules of which the operation is inhibited is operated, then said operation management section performs a hardware reset.

* * * * *